United States Patent [19]

Azpitarte Bolivar

[11] Patent Number: 4,852,473

[45] Date of Patent: Aug. 1, 1989

[54] WATER VAPOR RELIEF DEVICE FOR DOMESTIC COFFEE MAKERS

[75] Inventor: Domingo F. Azpitarte Bolivar, Durango Vizcaya, Spain

[73] Assignee: Oficina De Investigacion Agrupada, S.A, Eibar, Spain

[21] Appl. No.: 192,232

[22] Filed: May 9, 1988

[30] Foreign Application Priority Data

Dec. 3, 1987 [ES] Spain ..................... 8703782

[51] Int. Cl.$^4$ ............................................. A47J 31/46
[52] U.S. Cl. ..................... 99/293; 99/323.1; 99/323.2; 239/428.5
[58] Field of Search ............... 99/279, 293, 299, 300, 99/323.1, 323.3; 239/428.5, 425.5; 426/433

[56] References Cited

U.S. PATENT DOCUMENTS

| | | | |
|---|---|---|---|
| 4,287,817 | 9/1981 | Moskowitz | 99/293 |
| 4,565,121 | 1/1986 | Ohya | 99/293 |
| 4,632,024 | 12/1986 | Cortese | 99/293 |
| 4,655,394 | 4/1987 | Ferrazza | 239/428.5 |

*Primary Examiner*—Robert W. Jenkins
*Attorney, Agent, or Firm*—Helfgott & Karas

[57] ABSTRACT

A water vapor relief device for domestic coffee makers includes one tube connected to a vapor generator of the coffee maker and terminating at a free end thereof with an outlet hole and another tube which surrounds the first tube and forms therewith a chamber. The first tube at the end thereof carries an expanded head for a nozzle. A conduit formed between the nozzle and the head is inclined to produce the Venturi effect so that in the liquid such as milk in which the device is submerged the bubbling is produced which generates a foam.

3 Claims, 1 Drawing Sheet

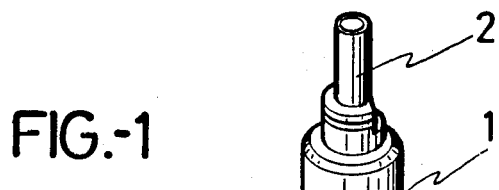
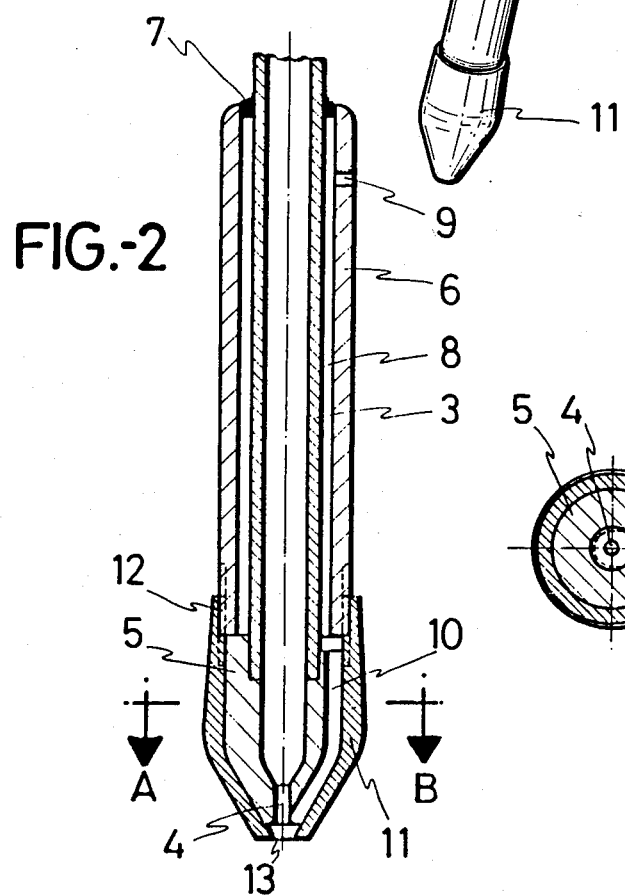
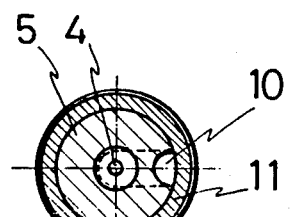

WATER VAPOR RELIEF DEVICE FOR DOMESTIC COFFEE MAKERS

BACKGROUND OF THE INVENTION

The present invention relates to a water vapour relief device of the type incorporated in domestic coffee makers, for heating milk to be added to coffee or simply for heating water for obtaining a cup of camomile, tea or the like.

Apart from the heating function of such water vapour relief devices, same also allow the vapour to be bubbled on the surface of the milk, whereby foam is produced thereon, i.e., a "creamy" coffee is obtained, this being very desireable for most coffee drinkers, once the milk has been added to the coffee.

However, obtaining this foam, with conventional devices, requires a certain skill on the part of the person handling same, i.e., a professional expertise, together with a wish to please the client, these being two conditionings which in practice do not always concur.

SUMMARY OF THE INVENTION

The water vapour relief device for domestic coffee makers which the invention describes has been designed to automatically achieve the above-mentioned effect, i.e., without the need for the device to be handled with a professional expertise.

In order to achieve the above, the device of the invention comprises a vapour outlet tube, the free end whereof ends in a small aperture. The outlet tube is provided by a surrounding tube which is duly stiffened thereto and forms therewith an annular chamber opening into a duct located close to the conventional outlet aperture, said chamber being in turn connected to the outside through an admission hole, such that when the water vapour escapes through the main aperture, it creates a depression in an auxiliary conduit which, due to the Venturi effect, determines the mixture of a certain amount of outside air with the water vapour, thereby producing in the milk, not only on its surface, but at any point thereof, a bubbling which gives rise to the desired foam.

More specifically, the free end of the inner conduit ends in an expanded head on the stepping whereof rests the corresponding and likewise end mouth of the surrounding tube, the other end whereof is fixed to the inner tube by means of a perimetral sequence which seals the two holes at this area, close to which is located the admission hole, a nozzle provided at its end with an aperture which faces the outlet hole of the inner or main tube being threadedly coupled to said surrounding tube, at the same time as said bush converts a groove provided on the head of the main tube, on an outer surface thereof and in correspondence with one of its generatrixes, into a duct which connects the chamber defined between both tubes with the outlet hole.

DESCRIPTION OF THE DRAWINGS

In order to complete the description being made, and to assist the better understanding of the characteristics of the invention, a set of drawings is attached to the present specification, as an integral part thereof, wherein the following has been shown, in an illustrative and non-limiting manner:

FIG. 1 is a perspective view of a water vapour relief device for domestic coffee makers, in accordance with the object of the present invention;

FIG. 2 is a diametric section of the same device at its end areas, on which the invention is centred.

FIG. 3 is a diametric section of the same device along line A–B of FIG. 1.

DESCRIPTION OF THE PREFERRED EMBODIMENT OF THE INVENTION

As can be seen from the drawings the water vapour relief device according to the invention comprises a nucleus 1 which extends into a neck 2 for coupling to the coffee maker, and which is hollow in order to receive the water vapour from the corresponding generator, which vapour, having passed through nucleus 1, runs along the inside of an arm 3, which is a tube of suitable length, provided with a hole 4 of reduced diameter on its free end, through which the vapour is released to the outside.

From this basic conventional structure, the invention is based on the fact that the free end of said tube ends in an expanded head 5 on which rests an auxiliary tube 6, coaxial with the former and being joined thereto by means of an annular welding 7 or other suitable means, an annular chamber 8 being defined therebetween, to which ouside air may enter through a hole 9, preferably provided on the area of said chamber being furthest from hole 4 through which the vapour is released, said chamber 8, on reaching head 5, extends through a groove 10 operatively made on the outer surface of head 5 and becomes a duct when nozzle 11 is coupled thereto, said nozzle being specifically fastened to surrounding tube 6 by means of a complementary threading 12, said nozzle being provided with a hole 13 at its free end or point which coaxially faces hole 4 of said main tube 3.

In accordance with the structure described, when the valve of the coffee maker is actuated and water vapour is released under pressure through hole 4, a depression is created within duct 10 which, due to the Venturi effect, sucks air into chamber 8 through hole 9, making same mix with the water vapour, the said mixture reaching the milk in which the device is submerged through hole 13 of nozzle 11, thereby producing, as previously mentioned, a bubbling effect which in turn produces the desired foam, as the bubbles rise through the milk to the surface thereof, and accumulate in this area.

It is not considered necessary to extend the present description any further for an expert in the art to understand the scope of the invention and the advantages derived therefrom.

The materials, shape, size and arrangement of the elements may vary, provided this does not imply a modification in the essentiality of the characteristics of the invention.

The terms used to describe the present specification should be understood to have a wide and non-limiting meaning.

I claim:

1. A water vapour relief device for domestic coffee makers, comprising a first tube connected to a vapour generator of the coffee maker, said tube having a free end terminating in a small outlet hole through which said vapour emerges to the outside, a second tube coaxial with and surrounding said first tube to define therebetween a chamber provided with a hole for admission thereinto of surrounding air, and an auxiliary conduit located close to the outlet hole of the first tube and inclined such that the water vapour, due to an outlet pressure thereof, generates, through the Venturi effect, a suction on said auxiliary conduit, such that the device as a whole supplies a mixture of water vapour and air which creates, in a liquid wherein the device is submerged, such as milk, the bubbling which generates a foam.

2. A water vapour relief device for domestic coffee makers in accordance with claim 1, wherein said first tube is provided, at said free end, with an expanded head which define a perimetral stepping with a remaining part of said first tube, said second tube having one end resting on said stepping and another end fixed to the first tube, said second tube being provided, on its end which rests on said stepping, with an outer thread for coupling thereto of a nozzle for said head, said nozzle and said head defining a groove for connection with the chamber defined between said second and first tubes and the outlet hole, which, with the aid of said nozzle, is converted into said conduit wherein the Venturi effect is created when water vapour is released from the first tube.

3. A water vapour relief device for domestic coffee makers in accordance with claim 2, wherein said another end is fixed to the first tube by welding.

* * * * *